United States Patent
Hayashi et al.

(10) Patent No.: US 11,385,503 B2
(45) Date of Patent: Jul. 12, 2022

(54) LIQUID CRYSTAL DISPLAY APPARATUS

(71) Applicant: NITTO DENKO CORPORATION, Ibaraki (JP)

(72) Inventors: Daisuke Hayashi, Ibaraki (JP); Sohei Aruga, Ibaraki (JP); Toshiyuki Iida, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 1 day.

(21) Appl. No.: 17/261,660

(22) PCT Filed: Aug. 19, 2020

(86) PCT No.: PCT/JP2020/031200
§ 371 (c)(1),
(2) Date: Jan. 20, 2021

(87) PCT Pub. No.: WO2021/149290
PCT Pub. Date: Jul. 29, 2021

(65) Prior Publication Data
US 2022/0107534 A1 Apr. 7, 2022

(30) Foreign Application Priority Data
Jan. 23, 2020 (JP) .............................. JP2020-008857

(51) Int. Cl.
*G02F 1/13363* (2006.01)
*G02F 1/1335* (2006.01)

(52) U.S. Cl.
CPC .. *G02F 1/133634* (2013.01); *G02F 1/133528* (2013.01)

(58) Field of Classification Search
CPC ................................................ G02F 1/133634
See application file for complete search history.

(56) References Cited

U.S. PATENT DOCUMENTS 7,817,226 B2  10/2010  Kajita et al.
8,274,627 B2   9/2012  Tomonaga et al.
(Continued)

FOREIGN PATENT DOCUMENTS

JP  2007-272177 A  10/2007
JP  2008-197193 A   8/2008
JP  2009-139747 A   6/2009

OTHER PUBLICATIONS

International Search Report in Japanese dated Nov. 2, 2020, issued in counterpart International Application No. PCT/JP2020/031200 (3 pages).

*Primary Examiner* — Edmond C Lau
(74) *Attorney, Agent, or Firm* — WHDA, LLP

(57) ABSTRACT

There is provided a liquid crystal display apparatus having sufficiently small black brightness in an oblique direction. A liquid crystal display apparatus according to an embodiment of the present invention includes: a liquid crystal cell including a viewer-side substrate, a back surface-side substrate, and a homogeneously aligned liquid crystal layer sandwiched therebetween; a first polarizer arranged on a viewer side of the liquid crystal cell; a second polarizer arranged on a back surface side of the liquid crystal cell; a first optical compensation layer arranged between the liquid crystal cell and the first polarizer; and a second optical compensation layer arranged between the liquid crystal cell and the second polarizer. The viewer-side substrate and the back surface-side substrate each have a thickness direction retardation Rth(550) of from −10 nm to 100 nm, and a product A×E is 300 or less.

10 Claims, 3 Drawing Sheets

(56) References Cited

U.S. PATENT DOCUMENTS

| | | |
|---|---|---|
| 8,368,859 B2 | 2/2013 | Nakayama et al. |
| 8,823,909 B2 | 9/2014 | Nakayama et al. |
| 9,097,837 B2 | 8/2015 | Nakayama et al. |
| 9,348,177 B2 | 5/2016 | Nakayama et al. |
| 9,726,932 B2 | 8/2017 | Nakayama et al. |
| 2004/0207787 A1* | 10/2004 | Nakamura .......... G02F 1/13363 349/119 |
| 2007/0076155 A1 | 4/2007 | Nakayama et al. |
| 2008/0192182 A1 | 8/2008 | Kajita et al. |
| 2010/0309414 A1 | 12/2010 | Tomonaga et al. |
| 2012/0182507 A1 | 7/2012 | Nakayama et al. |
| 2012/0236235 A1* | 9/2012 | Ishiguro ............... G02B 5/3083 445/24 |
| 2013/0003000 A1 | 1/2013 | Nakayama et al. |
| 2014/0055732 A1 | 2/2014 | Nakayama et al. |
| 2014/0168557 A1 | 6/2014 | Qin |
| 2014/0377528 A1 | 12/2014 | Nakayama et al. |
| 2015/0309348 A1 | 10/2015 | Nakayama et al. |
| 2016/0231606 A1 | 8/2016 | Nakayama et al. |
| 2019/0391433 A1* | 12/2019 | Hashimoto ............. H01L 27/32 |

* cited by examiner

LIQUID CRYSTAL DISPLAY APPARATUS

TECHNICAL FIELD

The present invention relates to a liquid crystal display apparatus.

BACKGROUND ART

In recent years, widespread use of a liquid crystal display apparatus as an image display apparatus has been striking. In the liquid crystal display apparatus, various liquid crystal drive modes have been adopted, and a liquid crystal display apparatus using a homogeneously aligned liquid crystal cell has been known as a typical example of the apparatus. Such liquid crystal display apparatus involves a problem in that its black brightness in an oblique direction does not become sufficiently small (i.e., when a black display is viewed from the oblique direction, the display does not become sufficiently black).

CITATION LIST

Patent Literature

[PTL 1] JP 2009-139747 A

SUMMARY OF INVENTION

Technical Problem

The present invention has been made to solve the conventional problem, and an object of the present invention is to provide a liquid crystal display apparatus having sufficiently small black brightness in an oblique direction.

Solution to Problem

A liquid crystal display apparatus according to an embodiment of the present invention includes: a liquid crystal cell including a viewer-side substrate, a back surface-side substrate, and a liquid crystal layer sandwiched between the viewer-side substrate and the back surface-side substrate, the layer containing liquid crystal molecules aligned in homogeneous alignment under a state in which an electric field is absent; a first polarizer arranged on a viewer side of the liquid crystal cell; a second polarizer arranged on a back surface side of the liquid crystal cell; a first optical compensation layer arranged between the liquid crystal cell and the first polarizer; and a second optical compensation layer arranged between the liquid crystal cell and the second polarizer. The viewer-side substrate and the back surface-side substrate each have a thickness direction retardation Rth(550) of from −10 nm to 100 nm, and a product A×E of a difference A (°) between a maximum and a minimum of azimuth angles of polarized light of light having a wavelength of from 450 nm to 650 nm, which is emitted from the liquid crystal cell in a direction at a polar angle of 60° and a direction at an azimuth angle of 45°, and a difference E (°) between a maximum and a minimum of ellipticities of the polarized light of the light is 300 or less.

In one embodiment of the present invention, the product A×E is 100 or less.

In one embodiment of the present invention, the first optical compensation layer shows a refractive index characteristic of nx>nz>ny, and the second optical compensation layer shows a refractive index characteristic of nz>nx=ny.

In one embodiment of the present invention, the second optical compensation layer has a thickness direction retardation Rth(550) of −70 nm or more and less than 0 nm.

In one embodiment of the present invention, the viewer-side substrate and the back surface-side substrate each satisfy a relationship of Rth(450)>Rth(550).

Advantageous Effects of Invention

According to the embodiment of the present invention, in the liquid crystal display apparatus including the homogeneously aligned liquid crystal cell, the polarization direction and ellipticity of the light emitted from the liquid crystal cell in an oblique direction are controlled in combination in consideration of the thickness direction retardations of the substrates of the liquid crystal cell. Accordingly, the liquid crystal display apparatus having sufficiently small black brightness in the oblique direction can be achieved.

DESCRIPTION OF EMBODIMENTS

Embodiments of the present invention are described below. However, the present invention is not limited to these embodiments.

Definitions of Terms and Symbols

The definitions of terms and symbols used herein are as described below.

(1) Refractive Indices ($n_x$, $n_y$, and $n_z$)

"$n_x$" represents a refractive index in a direction in which an in-plane refractive index is maximum (that is, slow axis direction), "$n_y$" represents a refractive index in a direction perpendicular to the slow axis in the plane (that is, fast axis direction), and "$n_z$" represents a refractive index in a thickness direction.

(2) In-Plane Retardation (Re)

"Re($\lambda$)" refers to an in-plane retardation measured at 23° C. with light having a wavelength of $\lambda$ nm. The Re($\lambda$) is determined from the equation "Re($\lambda$)=($n_x$−$n_y$)×d" when the thickness of a layer (film) is represented by d (nm). For example, "Re(550)" refers to an in-plane retardation measured at 23° C. with light having a wavelength of 550 nm.

(3) Thickness Direction Retardation (Rth)

"Rth($\lambda$)" refers to a thickness direction retardation measured at 23° C. with light having a wavelength of $\lambda$ nm. The Rth($\lambda$) is determined from the equation "Rth($\lambda$)=($n_x$−$n_z$)×d" when the thickness of a layer (film) is represented by d (nm). For example, "Rth(550)" refers to a thickness direction retardation measured at 23° C. with light having a wavelength of 550 nm.

(4) Nz Coefficient

An Nz coefficient is determined from the equation "Nz=Rth/Re".

(5) Substantially Perpendicular or Parallel

The expressions "substantially perpendicular" and "approximately perpendicular" include a case in which an angle formed by two directions is 90°±10°, and the angle is preferably 90°±7°, more preferably 90°±5°. The expressions "substantially parallel" and "approximately parallel" include a case in which an angle formed by two directions is 0°±10°, and the angle is preferably 0°±7°, more preferably 0°±5°. Moreover, the simple expression "perpendicular" or "parallel" as used herein may include a substantially perpendicular state or a substantially parallel state.

A. Overall Configuration of Liquid Crystal Display Apparatus

Figure 1:
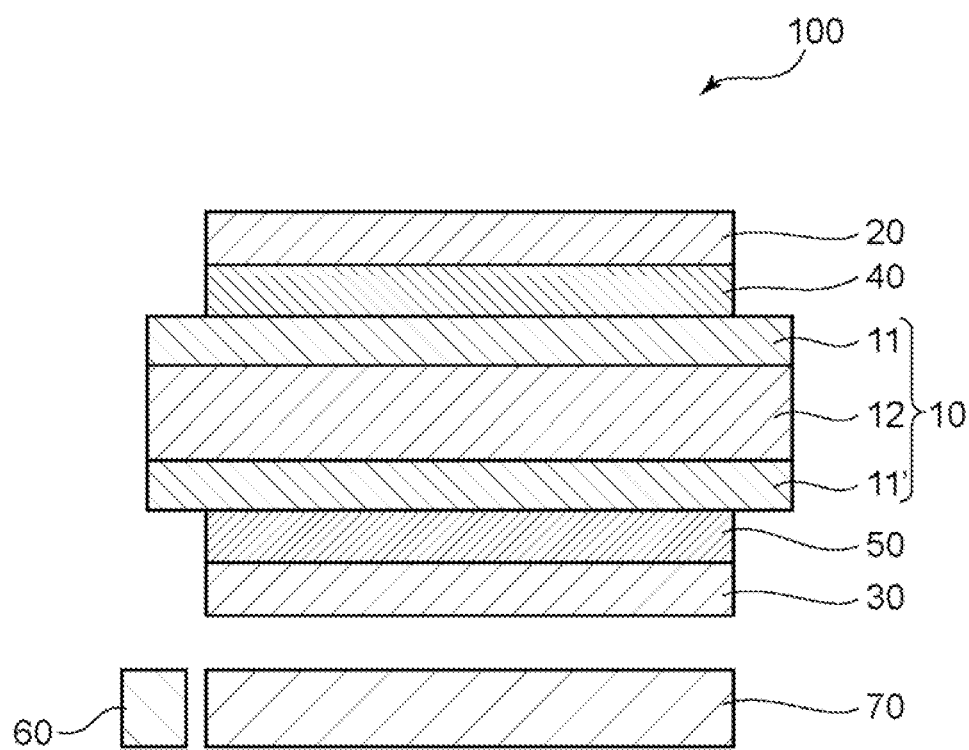
FIG. 1 is a schematic sectional view of a liquid crystal display apparatus according to one embodiment of the present invention.

FIG. 1 is a schematic sectional view of a liquid crystal display apparatus according to one embodiment of the present invention. A liquid crystal display apparatus 100 in the illustrated example includes: a liquid crystal cell 10; a first polarizer 20 arranged on the viewer side of the liquid crystal cell 10; a second polarizer 30 arranged on the back surface side of the liquid crystal cell 10; a first optical compensation layer 40 arranged between the liquid crystal cell 10 and the first polarizer 20; and a second optical compensation layer 50 arranged between the liquid crystal cell 10 and the second polarizer 30. The absorption axis direction of the first polarizer 20 and the absorption axis direction of the second polarizer 30 are typically substantially perpendicular to each other. The liquid crystal cell 10 includes: a viewer-side substrate 11; a back surface-side substrate 11'; and a liquid crystal layer 12 sandwiched between the viewer-side substrate 11 and the back surface-side substrate 11', the layer containing liquid crystal molecules aligned in homogeneous alignment under a state in which an electric field is absent. The liquid crystal display apparatus 100 practically further includes a backlight unit. The backlight unit includes a light source 60 and a light guide plate 70. The backlight unit may further include any appropriate other member (e.g., a diffusion sheet or a prism sheet). In the illustrated example, the backlight unit is of an edge light system, but any appropriate other system (e.g., a direct system) may be adopted for the backlight unit.

In the embodiment of the present invention, the product A×E of a difference A (°) between the maximum and minimum of the azimuth angles of the polarized light of light having a wavelength of from 450 nm to 650 nm, which is emitted from the liquid crystal cell 10 in a direction at a polar angle of 60° and a direction at an azimuth angle of 45°, and a difference E (°) between the maximum and minimum of the ellipticities of the polarized light of the light is 300 or less, preferably 200 or less, more preferably 150 or less, still more preferably 100 or less, particularly preferably 50 or less. The term "ellipticity" as used herein refers to an indicator showing whether the light (polarized light) is similar to circularly polarized light or to linearly polarized light. An ellipticity of 90° means that the light is substantially circularly polarized light, and an ellipticity of 0° means that the light is substantially linearly polarized light. The product A×E is preferably as small as possible. Accordingly, the product A×E is ideally zero. That is, in the embodiment of the present invention, it is preferred that the difference between the maximum and minimum of the azimuth angles of the light (polarized light) having a wavelength of from 450 nm to 650 nm, which is emitted from the liquid crystal cell 10 in the direction at a polar angle of 60° and the direction at an azimuth angle of 45°, be 0 (zero), and/or the light be linearly polarized light. The inventors of the present invention have made extensive investigations on a reduction in black brightness in an oblique direction in a liquid crystal display apparatus including a homogeneously aligned liquid crystal cell, and as a result, have found that the reduction results from the fact that the polarization state of light immediately before its entry into an optical compensation layer (in this embodiment, the first optical compensation layer) largely varies depending on its colors, that is, a red color (R), a green color (G), and a blue color (B). Thus, the inventors have found that a useful measure to unify the polarization state of the light is to control the difference A (°) between the maximum and minimum of the azimuth angles of the polarized light of the light having a wavelength of from 450 nm to 650 nm, which is emitted from the liquid crystal cell 10 in the direction at a polar angle of 60° and the direction at an azimuth angle of 45°, and the difference E (°) between the maximum and minimum of the ellipticities of the polarized light of the light in combination. When the product A×E is set to a predetermined value or less as described above, in the liquid crystal display apparatus including the homogeneously aligned liquid crystal cell, black brightness in an oblique direction can be made sufficiently small (i.e., when a black display is viewed from the oblique direction, the display can be made sufficiently black).

In the embodiment of the present invention, the thickness direction retardation Rth(550) of each of the viewer-side substrate 11 and the back surface-side substrate 11' is from −10 nm to 100 nm. The inventors of the present invention have found that a cause for the fact that the polarization state of the light immediately before its entry into the optical compensation layer described above largely varies depending on its colors, that is, the R, G, and B colors is the thickness direction retardation of each of the substrates. That is, the inventors have found that while the in-plane retardations of the substrates are close to zero in many cases, at least one of the substrates has a thickness direction retardation equal to or more than a predetermined value, and such thickness direction retardation affects the polarization state of the light (in particular, a polarization state depending on the R, G, and B colors). In the embodiment of the present invention, in the liquid crystal display apparatus including the homogeneously aligned liquid crystal cell, black brightness in an oblique direction can be made sufficiently small by setting the product A×E to a predetermined value or less as described above while considering such thickness direction retardation of the substrate.

Figure 2:
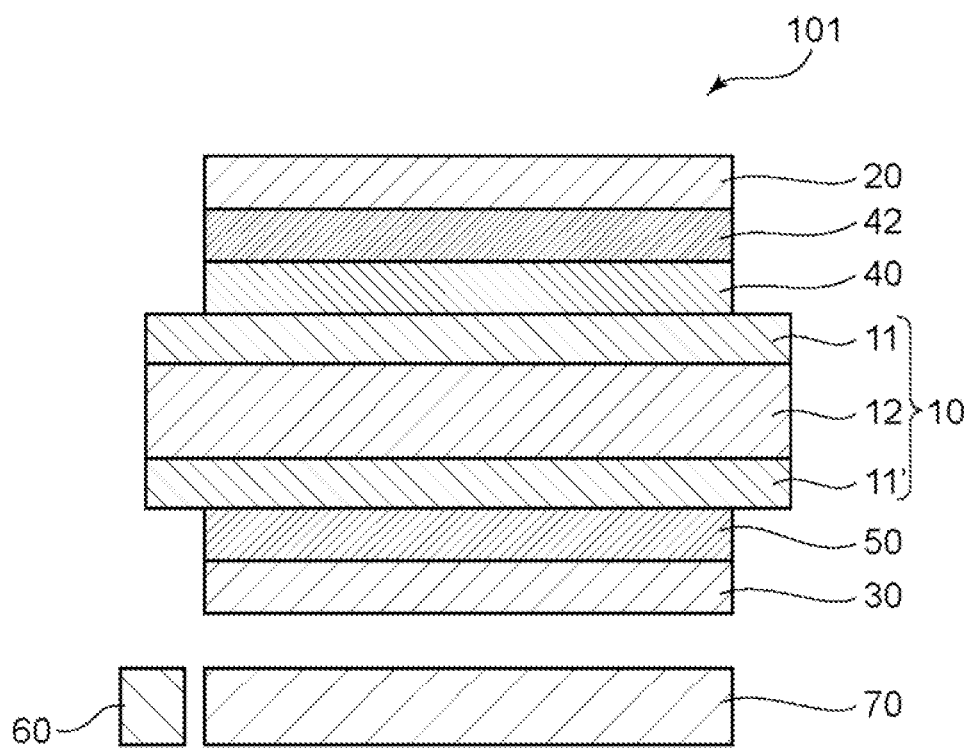
FIG. 2 is a schematic sectional view of a liquid crystal display apparatus according to another embodiment of the present invention.
Figure 3:
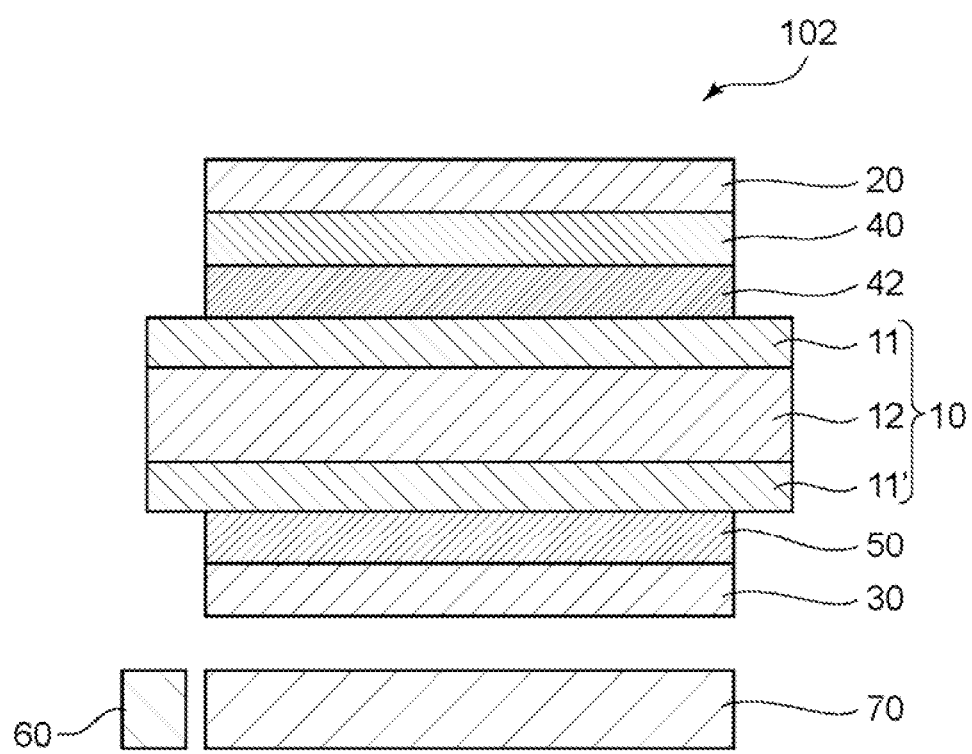
FIG. 3 is a schematic sectional view of a liquid crystal display apparatus according to still another embodiment of the present invention.

The first optical compensation layer 40 may show any appropriate refractive index characteristic in accordance with purposes. In one embodiment, the first optical compensation layer 40 shows a refractive index characteristic of nx>nz>ny. In the case where the first optical compensation layer showing a refractive index characteristic of nx>nz>ny is arranged on the viewer side of the liquid crystal cell, in the liquid crystal display apparatus including the homogeneously aligned liquid crystal cell, a hue in an oblique direction can be satisfactorily improved. In this case, the first optical compensation layer is typically formed as a single layer as illustrated in FIG. 1. In this case, the first optical compensation layer preferably has an in-plane retardation Re(550) of from 220 nm to 320 nm, and preferably has an Nz coefficient of from 0.3 to 0.7. The slow axis direction of the first optical compensation layer 40 and the absorption axis direction of the first polarizer 20 are typically substantially perpendicular or parallel to each other. In another embodiment, the first optical compensation layer may be equivalent to a laminate with a third optical compensation layer 42 as illustrated in FIG. 2 or FIG. 3. In this case, the first optical compensation layer 40 may typically show a refractive index characteristic of nz>nx>ny, and a third optical compensation layer 42 may typically show a refractive index characteristic of nx>ny≥nz. The first optical compensation layer 40 preferably has an Re(550) of from 20 nm to 50 nm, and preferably has an Nz coefficient of −1.0 or less. In the example illustrated in FIG. 2, the third optical compensation layer 42 may be arranged on the viewer side of the first optical compensation layer 40. In this case, the third optical compensation layer typically shows a refractive index characteristic of nx>ny>nz, and the slow axis direction of the first optical compensation layer 40 and the slow axis direction of the third optical compensation layer 42 are typically substantially parallel to each other. In the example illustrated in FIG. 3, the third optical compensation layer 42 may be arranged on the side of the first optical compensation layer 40 opposite to the viewer side. In this case, the third optical compensation layer typically shows a refractive index characteristic of nx>ny=nz, and the slow axis direction of the first optical compensation layer 40 and the slow axis direction of the third optical compensation layer 42 are typically substantially perpendicular to each other.

The second optical compensation layer 50 typically shows a refractive index characteristic of nz>nx=ny. The Rth(550) of the second optical compensation layer 50 is preferably −70 nm or more and less than 0 nm. When such second optical compensation layer is arranged on the back surface side of the liquid crystal cell, the above-mentioned product A×E can be set to a predetermined value or less, and as a result, in the liquid crystal display apparatus including the homogeneously aligned liquid crystal cell, black brightness in an oblique direction can be made sufficiently small.

The liquid crystal display apparatus may be in a so-called O mode or a so-called E mode. The term "liquid crystal display apparatus in the O mode" refers to a liquid crystal display apparatus in which the absorption axis direction of the polarizer arranged on the back surface side of the liquid crystal cell (in the embodiment of the present invention, the second polarizer) is substantially parallel to the initial alignment direction of the liquid crystal cell. The term "liquid crystal display apparatus in the E mode" refers to a liquid crystal display apparatus in which the absorption axis direction of the polarizer arranged on the back surface side of the liquid crystal cell is substantially perpendicular to the initial alignment direction of the liquid crystal cell. The term "initial alignment direction of the liquid crystal cell" refers to such a direction that, under a state in which an electric field is absent, the in-plane refractive index of the liquid crystal layer obtained as a result of alignment of liquid crystal molecules contained in the liquid crystal layer becomes maximum (i.e., a slow axis direction). The liquid crystal display apparatus is preferably in the O mode.

The liquid crystal display apparatus may further include any appropriate other member. For example, any other optical compensation layer (retardation film) may be further arranged. The optical characteristics, number, combination, arrangement positions, and the like of the other optical compensation layers may be appropriately selected in accordance with, for example, purposes and desired optical characteristics. The configuration of a liquid crystal display apparatus that is well known and commonly used in the art may be adopted as a matter that is not described herein.

Each member and each optical film forming the liquid crystal display apparatus are described below.

B. Liquid Crystal Cell

As described above, the liquid crystal cell 10 includes: the viewer-side substrate 11; the back surface-side substrate 11'; and the liquid crystal layer 12 sandwiched between the viewer-side substrate and the back surface-side substrate, the layer containing the liquid crystal molecules aligned in homogeneous alignment under a state in which an electric field is absent. In a general configuration, a color filter and a black matrix are arranged on one substrate (typically the viewer-side substrate 11), and a switching element configured to control the electro-optical characteristics of liquid crystal, a scanning line configured to apply a gate signal to the switching element and a signal line configured to apply a source signal thereto, and a pixel electrode and a counter electrode are arranged on the other substrate (typically the back surface-side substrate 11'). An interval (cell gap) between the substrates is controlled by a spacer or the like. For example, an alignment film formed of polyimide may be arranged on the side of each of the substrates in contact with the liquid crystal layer.

As described above, the Rth(550) of each of the viewer-side substrate 11 and the back surface-side substrate 11' is from −10 nm to 100 nm. In one embodiment, the Rth(550) of at least one of the viewer-side substrate 11 or the back surface-side substrate 11' is preferably from 8 nm to 90 nm, more preferably from 15 nm to 80 nm, still more preferably from 20 nm to 70 nm, particularly preferably from 30 nm to 60 nm. In another embodiment, the Rth(550) of at least one of the viewer-side substrate 11 or the back surface-side substrate 11' is preferably −0.1 nm or less, more preferably from −5 nm to −50 nm. According to the embodiment of the present invention, when the substrates each have any such thickness direction retardation, in the liquid crystal display apparatus including the homogeneously aligned liquid crystal cell, black brightness in an oblique direction can be made sufficiently small by setting the product A×E to a predetermined value or less as described above.

In one embodiment, at least one of the viewer-side substrate 11 or the back surface-side substrate 11' satisfies a relationship of Rth(450)>Rth(550), and it is preferred that both of the viewer-side substrate 11 and the back surface-side substrate 11' each satisfy a relationship of Rth(450)>Rth(550). It is more preferred that at least one of the viewer-side substrate 11 or the back surface-side substrate 11' further satisfy a relationship of Rth(550)>Rth(650), and it is still more preferred that both of the viewer-side substrate 11 and the back surface-side substrate 11' each further satisfy a relationship of Rth(550)>Rth(650). According to the embodiment of the present invention, even when the substrates each have any such wavelength dispersion characteristic, in the liquid crystal display apparatus including the homogeneously aligned liquid crystal cell, black brightness in an oblique direction can be made sufficiently small.

As described above, the liquid crystal layer contains liquid crystal molecules aligned in homogeneous alignment under a state in which an electric field is absent. The term "liquid crystal molecules aligned in homogeneous alignment" refers to liquid crystal molecules in the following state: as a result of an interaction between an alignment-treated substrate and each of the liquid crystal molecules, the alignment vector of each of the liquid crystal molecules is aligned in a parallel and uniform manner with respect to the plane of the substrate. Such liquid crystal layer (as a result, the liquid crystal cell) typically shows a refractive index characteristic of nx>ny=nz. The "ny=nz" as used herein includes not only a case in which ny is completely equal to nz, but also a case in which ny is substantially equal to nz. The Re(550) of the liquid crystal layer may be, for example, from 300 nm to 400 nm. The Nz coefficient of the liquid crystal layer may be, for example, from 0.9 to 1.1.

Typical examples of a drive mode using the liquid crystal layer showing the refractive index characteristic as described above include an in-plane switching (IPS) mode and a fringe field switching (FFS) mode. The above-mentioned IPS mode includes a super in-plane switching (S-IPS) mode and an advanced super in-plane switching (AS-IPS) mode, each of which adopts a V-shaped electrode, a zigzag electrode, or the like. In addition, the above-mentioned FFS mode includes an advanced fringe field switching (A-FFS) mode and an ultra fringe field switching (U-FFS) mode, each of which adopts a V-shaped electrode, a zigzag electrode, or the like.

In one embodiment, the liquid crystal molecules of the liquid crystal layer each have a pretilt. That is, the alignment vector of each of the liquid crystal molecules is slightly tilted with respect to the plane of the substrate. A pretilt angle is preferably from 0.1° to 1.0°, more preferably from 0.2° to 0.7°.

C. Polarizer

Any appropriate polarizer may be adopted as each of the first polarizer and the second polarizer (hereinafter sometimes collectively simply referred to as "polarizers"). For example, a resin film forming the polarizer may be a single-layer resin film, or may be a laminate of two or more layers.

Specific examples of the polarizer including a single-layer resin film include: a polarizer obtained by subjecting a hydrophilic polymer film, such as a polyvinyl alcohol (PVA)-based film, a partially formalized PVA-based film, or an ethylene-vinyl acetate copolymer-based partially saponified film, to dyeing treatment with a dichroic substance, such as iodine or a dichroic dye, and stretching treatment; and a polyene-based alignment film, such as a dehydration-treated product of PVA or a dehydrochlorination-treated product of polyvinyl chloride. A polarizer obtained by dyeing the PVA-based film with iodine and uniaxially stretching the resultant is preferably used because the polarizer is excellent in optical characteristics.

The dyeing with iodine is performed by, for example, immersing the PVA-based film in an aqueous solution of iodine. The stretching ratio of the uniaxial stretching is preferably from 3 times to 7 times. The stretching may be performed after the dyeing treatment, or may be performed while the dyeing is performed. In addition, the dyeing may be performed after the stretching has been performed. The PVA-based film is subjected to swelling treatment, crosslinking treatment, washing treatment, drying treatment, or the like as required. For example, when the PVA-based film is immersed in water to be washed with water before the dyeing, contamination or an antiblocking agent on the surface of the PVA-based film can be washed off. In addition, the PVA-based film is swollen and hence dyeing unevenness or the like can be prevented.

The polarizer obtained by using the laminate is specifically, for example, a polarizer obtained by using a laminate of a resin substrate and a PVA-based resin layer (PVA-based resin film) laminated on the resin substrate, or a laminate of a resin substrate and a PVA-based resin layer formed on the resin substrate through application. The polarizer obtained by using the laminate of the resin substrate and the PVA-based resin layer formed on the resin substrate through application may be produced by, for example, a method involving: applying a PVA-based resin solution onto the resin substrate; drying the solution to form the PVA-based resin layer on the resin substrate, to thereby provide the laminate of the resin substrate and the PVA-based resin layer; and stretching and dyeing the laminate to turn the PVA-based resin layer into the polarizer. In this embodiment, the stretching typically includes the stretching of the laminate under a state in which the laminate is immersed in an aqueous solution of boric acid. The stretching may further include the aerial stretching of the laminate at high temperature (e.g., 95° C. or more) before the stretching in the aqueous solution of boric acid as required. The resultant laminate of the resin substrate and the polarizer may be used as it is (i.e., the resin substrate may be used as a protective layer for the polarizer). Alternatively, a product obtained as described below may be used: the resin substrate is peeled from the laminate of the resin substrate and the polarizer, and any appropriate protective layer in accordance with purposes is laminated on the peeling surface. Details about such method of producing a polarizer are described in, for example, JP 2012-73580 A and JP 6470455 B. The entire description of the publications is incorporated herein by reference.

The thickness of the polarizer is, for example, from 1 μm to 80 μm, preferably from 1 μm to 15 μm, more preferably from 1 μm to 12 μm, still more preferably from 3 μm to 12 μm, particularly preferably from 3 μm to 8 μm. When the thickness of the polarizer falls within such range, curling at the time of heating can be satisfactorily suppressed, and satisfactory appearance durability at the time of heating is obtained.

The polarizer preferably shows absorption dichroism at any wavelength in the wavelength range of from 380 nm to 780 nm. The single layer transmittance of the polarizer is, for example, from 41.5% to 46.0%, preferably from 43.0% to 46.0%, more preferably from 44.5% to 46.0%. The polarization degree of the polarizer is preferably 97.0% or more, more preferably 99.0% or more, still more preferably 99.9% or more.

A protective layer (not shown) may be arranged on at least one surface of each of the first polarizer 20 and the second polarizer 30. That is, each of the first polarizer 20 and the second polarizer 30 may be incorporated as a polarizing plate into the liquid crystal display apparatus.

The protective layer is formed of any appropriate film that may be used as a protective layer for a polarizer. A material serving as a main component of the film is specifically, for example: a cellulose-based resin, such as triacetylcellulose (TAC); a transparent resin, such as a polyester-based, polyvinyl alcohol-based, polycarbonate-based, polyamide-based, polyimide-based, polyether sulfone-based, polysulfone-based, polystyrene-based, polynorbornene-based, polyolefin-based, (meth)acrylic, or acetate-based transparent resin; or a thermosetting resin or a UV-curable resin, such as a (meth)acrylic, urethane-based, (meth)acrylic urethane-based, epoxy-based, or silicone-based thermosetting resin or UV-curable resin. A further example thereof is a glassy polymer, such as a siloxane-based polymer. In addition, a polymer film described in JP 2001-343529 A (WO 01/37007 A1) may be used. For example, a resin composition containing a thermoplastic resin having a substituted or unsubstituted imide group on a side chain thereof, and a thermoplastic resin having a substituted or unsubstituted phenyl group and a nitrile group on side chains thereof may be used as the material for the film, and the composition is, for example, a resin composition containing an alternating copolymer formed of isobutene and N-methylmaleimide, and an acrylonitrile-styrene copolymer. The polymer film may be, for example, an extrudate of the resin composition.

When the protective layer is arranged on the viewer side of the first polarizer 20, the protective layer may be subjected to surface treatment, such as hard coat treatment, antireflection treatment, anti-sticking treatment, or antiglare treatment, as required.

The thickness of the protective layer is typically 5 mm or less, preferably 1 mm or less, more preferably from 1 μm to 500 μm, still more preferably from 5 μm to 150 μm. When the protective layer is subjected to surface treatment, its thickness is a thickness including the thickness of a surface-treated layer.

When the protective layer (hereinafter referred to as "inner protective layer") is arranged on the liquid crystal cell side of the first polarizer 20 and/or the second polarizer 30, the inner protective layer is preferably optically isotropic. The phrase "be optically isotropic" refers to having an in-plane retardation Re(550) of from 0 nm to 10 nm and a thickness direction retardation Rth(550) of from −10 nm to +10 nm. The inner protective layer may include any appropriate material as long as the inner protective layer is optically isotropic. The material may be appropriately selected from, for example, the materials described above for the protective layer.

The thickness of the inner protective layer is preferably from 5 μm to 200 μm, more preferably from 10 μm to 100 μm, still more preferably from 15 μm to 95 μm.

D. First Optical Compensation Layer

D-1. First Optical Compensation Layer Including Single Layer

When the first optical compensation layer 40 is formed as a single layer, as described above, the first optical compensation layer typically shows a refractive index characteristic of nx>nz>ny. When the first optical compensation layer showing a refractive index characteristic of nx>nz>ny is arranged on the viewer side of the liquid crystal cell, in the liquid crystal display apparatus including the homogeneously aligned liquid crystal cell, a hue in an oblique direction can be satisfactorily improved.

The Re(550) of the first optical compensation layer is preferably from 220 nm to 320 nm, more preferably from 240 nm to 300 nm, still more preferably from 250 nm to 290 nm, particularly preferably from 260 nm to 280 nm. When the Re(550) of the first optical compensation layer falls within such ranges, a moving distance on a Poincare sphere is short. Accordingly, an excellent hue and an excellent brightness characteristic are achieved, and a shift due to the retardation component of a TFT (switching element) becomes smaller.

The Nz coefficient of the first optical compensation layer is preferably from 0.3 to 0.7, more preferably from 0.4 to 0.6, still more preferably from 0.45 to 0.55. When the Nz coefficient falls within such ranges, the hue in the oblique direction can be more satisfactorily improved.

The first optical compensation layer may show such a reverse wavelength dispersion characteristic that its retardation value increases with an increase in wavelength of measurement light, may show such a positive wavelength dispersion characteristic that the retardation value reduces with an increase in wavelength of the measurement light, or may show such a flat wavelength dispersion characteristic that the retardation value is substantially free from being changed by the wavelength of the measurement light. The first optical compensation layer preferably shows the reverse wavelength dispersion characteristic. In the case where the first optical compensation layer shows the reverse wavelength dispersion characteristic, an excellent reflection hue can be achieved. In this case, the in-plane retardations of the first optical compensation layer satisfy a relationship of Re(450)<Re(550). A ratio "Re(450)/Re(550)" is preferably 0.8 or more and less than 1, more preferably 0.8 or more and 0.95 or less. The in-plane retardations of the first optical compensation layer more preferably also satisfy a relationship of Re(550)<Re(650). A ratio "Re(550)/Re(650)" is preferably 0.8 or more and less than 1, more preferably 0.8 or more and 0.95 or less.

The photoelastic coefficient of the first optical compensation layer is, for example, $10 \times 10^{-12}$ m²/N or more, preferably $1.0 \times 10^{-10}$ m²/N or more, more preferably from $1.0 \times 10^{-10}$ m²/N to $3.0 \times 10^{-10}$ m²/N. The first optical compensation layer, which has such a small thickness as described later, can achieve the desired in-plane retardations and the desired Nz coefficient described above. In this case, the photoelastic coefficient often increases as described above. According to the embodiment of the present invention, however, even when a layer having a large photoelastic coefficient is used, a liquid crystal display apparatus having a satisfactory display characteristic can be achieved.

The first optical compensation layer is typically a retardation film formed of any appropriate resin that can achieve the above-mentioned characteristic. Examples of the resin forming the retardation film include polyarylate, polyamide, polyimide, polyester, polyaryletherketone, polyamide-imide, polyesterimide, polyvinyl alcohol, polyfumarate, polyethersulfone, polysulfone, a norbornene resin, a polycarbonate resin, a cellulose resin, and polyurethane. Those resins may be used alone or in combination thereof. Of those, polyarylate or a polycarbonate resin is preferred.

The polyarylate is preferably represented by the following formula (1).

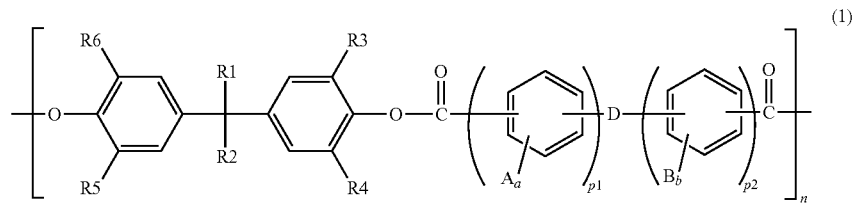

In the formula (1): A and B each represent a substituent, specifically a halogen atom, an alkyl group having 1 to 6 carbon atoms, or a substituted or unsubstituted aryl group, and A and B may be identical to or different from each other; a and b represent the numbers of substitutions with A and B, respectively, and each represent an integer of from 1 to 4; D represents a covalent bond, a CH₂ group, a C(CH₃)₂ group, a C(CZ₃)₂ group, where Z represents a halogen atom, a CO group, an O atom, a S atom, a SO₂ group, a Si(CH₂CH₃)₂ group, or a N(CH₃) group; R1 represents a linear or branched alkyl group having 1 to 10 carbon atoms, or a substituted or unsubstituted aryl group; R2 represents a linear or branched alkyl group having 2 to 10 carbon atoms, or a substituted or unsubstituted aryl group; R3, R4, R5, and R6 each independently represent a hydrogen atom or a linear or branched alkyl group having 1 to 4 carbon atoms, and R3, R4, R5, and R6 may be identical to or different from each other; and p1 represents an integer of from 0 to 3, p2 represents an integer of from 1 to 3, and n represents an integer of 2 or more.

Any appropriate polycarbonate resin may be used as the polycarbonate resin. The polycarbonate resin preferably includes a structural unit derived from a fluorene-based dihydroxy compound, a structural unit derived from an isosorbide-based dihydroxy compound, and a structural unit derived from at least one dihydroxy compound selected from the group consisting of an alicyclic diol, an alicyclic dimethanol, di, tri, or polyethylene glycol, and an alkylene glycol or a spiroglycol. The polycarbonate resin preferably includes the structural unit derived from the fluorene-based dihydroxy compound, the structural unit derived from the isosorbide-based dihydroxy compound, and a structural unit derived from the alicyclic dimethanol and/or a structural unit derived from di, tri, or polyethylene glycol. The polycarbonate resin more preferably includes the structural unit derived from the fluorene-based dihydroxy compound, the structural unit derived from the isosorbide-based dihydroxy compound, and the structural unit derived from di, tri, or polyethylene glycol. The polycarbonate resin may include a structural unit derived from any other dihydroxy compound as required. The details of the polycarbonate resin are described in, for example, JP 2014-10291 A and JP 2014-26266 A, the description of which is incorporated herein by reference.

The glass transition temperature of the polycarbonate resin is preferably 110° C. or more and 180° C. or less, more preferably 120° C. or more and 165° C. or less. When the glass transition temperature is excessively low, the heat resistance of the resin tends to deteriorate, and hence the resin may cause a dimensional change after having been formed into a film. In addition, the image quality of the liquid crystal display apparatus to be obtained may reduce. When the glass transition temperature is excessively high, the forming stability of the resin at the time of its forming into a film may deteriorate, and the transparency of the film may be impaired. The glass transition temperature is determined in conformity with JIS K 7121 (1987).

The molecular weight of the polycarbonate resin may be represented in terms of reduced viscosity. The reduced viscosity is measured as follows: a solution of the polycarbonate resin is prepared by using methylene chloride as a solvent so that its polycarbonate concentration may be precisely 0.6 g/dL; and the reduced viscosity of the solution is measured at a temperature of 20.0° C.±0.1° C. with an Ubbelohde viscosity tube. In normal cases, the lower limit of the reduced viscosity is preferably 0.30 dL/g, more preferably 0.35 dL/g or more. In normal cases, the upper limit of the reduced viscosity is preferably 1.20 dL/g, more preferably 1.00 dL/g, still more preferably 0.80 dL/g. When the reduced viscosity is less than the lower limit value, a problem in that the mechanical strength of a formed article of the resin reduces may occur. Meanwhile, when the reduced viscosity is more than the upper limit value, a problem in that the fluidity of the resin at the time of its forming reduces to cause a reduction in productivity or formability may occur.

The first optical compensation layer may be formed by, for example, dissolving or dispersing the resin in any appropriate solvent to prepare an application liquid, applying the application liquid to a shrinkable film to form an applied film, and shrinking the applied film. Typically, the shrinkage of the applied film is performed as follows: a laminate of the shrinkable film and the applied film is heated to shrink the shrinkable film, and the applied film is shrunk by such shrinkage of the shrinkable film. The shrinkage ratio of the applied film is preferably from 0.50 to 0.99, more preferably from 0.60 to 0.98, still more preferably from 0.70 to 0.95. A heating temperature is preferably from 130° C. to 170° C., more preferably from 150° C. to 160° C. In one embodiment, at the time of the shrinkage of the applied film, the laminate may be stretched in a direction perpendicular to the direction in which the applied film is shrunk. In this case, the stretching ratio of the laminate is preferably from 1.01 times to 3.0 times, more preferably from 1.05 times to 2.0 times, still more preferably from 1.10 times to 1.50 times. Specific examples of a material forming the shrinkable film include polyolefin, polyester, an acrylic resin, polyamide, polycarbonate, a norbornene resin, polystyrene, polyvinyl chloride, polyvinylidene chloride, a cellulose resin, polyethersulfone, polysulfone, polyimide, polyacryl, an acetate resin, polyarylate, polyvinyl alcohol, and a liquid crystal polymer. Those materials may be used alone or in combination thereof. The shrinkable film is preferably a stretched film formed from any such material.

The thickness of the first optical compensation layer is preferably 30 µm or less, more preferably from 10 µm to 25 µm, still more preferably from 17 µm to 20 µm. The first optical compensation layer to be used in the embodiment of the present invention can significantly contribute to the thinning of the liquid crystal display apparatus because the layer provides the desired in-plane retardations and the desired Nz coefficient described above despite such small thickness.

D-2. First Optical Compensation Layer Formed as Equivalent to Laminate with Third Optical Compensation Layer D-2-1. First Optical Compensation Layer As described above, the first optical compensation layer may be equivalent to a laminate with the third optical compensation layer (FIG. 2 or FIG. 3). In this case, the first optical compensation layer 40 typically shows a refractive index characteristic of nz>nx>ny. A layer (film) showing such refractive index characteristic may be referred to as, for example, "positive biaxial plate" or "positive B-plate".

The in-plane retardation Re(550) of the first optical compensation layer is preferably from 20 nm to 50 nm, more preferably from 25 nm to 45 nm, still more preferably from 30 nm to 40 nm. The Rth(550) of the first optical compensation layer is preferably from −140 nm to −70 nm, more preferably from −100 nm to −75 nm, still more preferably from −95 nm to −80 nm. The Nz coefficient of the first optical compensation layer is preferably −1.0 or less, more preferably from −7.0 to −2.0, still more preferably from −5.0 to −2.3. When the first optical compensation layer having such optical characteristics is used in combination with such third optical compensation layer as described later, the absorption axes of the polarizers are suitably compensated, and hence black brightness in an oblique direction in the liquid crystal display apparatus can be made sufficiently small. In addition, a color shift in the oblique direction can be reduced.

The first optical compensation layer typically includes a resin film. A material for the resin film is typically, for example, a resin material having negative birefringence. Specific examples of the resin material include an acrylic resin, a styrene-based resin, a maleimide-based resin, and a fumarate-based resin.

The thickness of the first optical compensation layer is preferably from 1 μm to 50 μm, more preferably from 3 μm to 35 μm.

D-2-2. Third Optical Compensation Layer

As described above, the third optical compensation layer 42 may typically show a refractive index characteristic of nx>ny≥nz. When the third optical compensation layer 42 is arranged on the viewer side of the first optical compensation layer 40 as illustrated in FIG. 2, the third optical compensation layer typically shows a refractive index characteristic of nx>ny≥nz, and the slow axis direction of the first optical compensation layer 40 and the slow axis direction of the third optical compensation layer 42 are typically substantially parallel to each other. When the third optical compensation layer 42 is arranged on the side of the first optical compensation layer 40 opposite to the viewer side as illustrated in FIG. 3, the third optical compensation layer typically shows a refractive index characteristic of nx>ny=nz, and the slow axis direction of the first optical compensation layer 40 and the slow axis direction of the third optical compensation layer 42 are typically substantially perpendicular to each other. In each case, the Re(550) of the third optical compensation layer is preferably from 100 nm to 200 nm, more preferably from 110 nm to 180 nm, still more preferably from 110 nm to 160 nm, particularly preferably from 110 nm to 140 nm. The Nz coefficient of the third optical compensation layer is preferably from 0.9 to 1.5, more preferably from 0.9 to 1.3. When the Re(550) and Nz coefficient of the third optical compensation layer fall within such ranges, an excellent hue and an excellent brightness characteristic are achieved, and the hue in the oblique direction can be more satisfactorily improved.

The third optical compensation layer may typically include a stretched film (retardation film) of a resin film. Any appropriate resin may be adopted as a resin for forming the film in accordance with purposes. Specific examples of the resin for forming the film include a polycarbonate-based resin, a polyester carbonate-based resin, a polyester-based resin, a polyvinyl acetal-based resin, a polyarylate-based resin, a cyclic olefin-based resin, a cellulose-based resin, a polyvinyl alcohol-based resin, a polyamide-based resin, a polyimide-based resin, a polyether-based resin, a polystyrene-based resin, and an acrylic resin. Those resins may be used alone or in combination (e.g., a blend or a copolymer) thereof. Detailed description of a method of forming the retardation film is omitted because a method well known in the art may be adopted as the method.

E. Second Optical Compensation Layer

As described above, the second optical compensation layer 50 typically shows a refractive index characteristic of nz>nx=ny. When such second optical compensation layer is arranged on the back surface side of the liquid crystal cell, the above-mentioned product A×E can be set to a predetermined value or less, and as a result, in the liquid crystal display apparatus including the homogeneously aligned liquid crystal cell, black brightness in an oblique direction can be made sufficiently small. A layer (film) showing such refractive index characteristic may be referred to as "positive C-plate".

The Rth(550) of the second optical compensation layer is preferably −70 nm or more and less than 0 nm, more preferably −60 nm or more and less than 0 nm, still more preferably from −40 nm to −5 nm, particularly preferably from −30 nm to −10 nm. When the Rth(550) of the second optical compensation layer falls within such ranges, in the liquid crystal display apparatus including the homogeneously aligned liquid crystal cell, the black brightness in the oblique direction can be more satisfactorily reduced.

The second optical compensation layer may be formed from any appropriate material. The second optical compensation layer is preferably formed of a film containing a liquid crystal material fixed in homeotropic alignment. The liquid crystal material (liquid crystal compound) that can be homeotropically aligned may be a liquid crystal monomer, or may be a liquid crystal polymer. Specific examples of methods of forming the liquid crystal compound and the optical compensation layer include methods of forming the liquid crystal compound and the optical compensation layer described in [0020] to [0028] of JP 2002-333642 A. In this case, the thickness of the second optical compensation layer is preferably from 0.5 μm to 10 μm, more preferably from 0.5 μm to 8 μm, still more preferably from 0.5 μm to 5 μm.

F. Backlight Unit

The light source 60 is arranged at a position corresponding to a side surface of the light guide plate 70. For example, a LED light source formed by arraying a plurality of LEDs may be used as the light source. Any appropriate light guide plate may be used as the light guide plate 70. For example, a light guide plate having a lens pattern formed on its back surface side so that light from a lateral direction can be deflected in its thickness direction, or a light guide plate having a prism shape or the like formed on its back surface side and/or its viewer side is used. A light guide plate having prism shapes formed on its back surface side and its viewer side is preferably used. In the light guide plate, the ridge line directions of the prism shape formed on the back surface side and the prism shape formed on the viewer side are preferably perpendicular to each other. When such light guide plate is used, light that is more easily converged can be caused to enter a prism sheet (not shown).

EXAMPLES

The present invention is specifically described by way of Examples, but the present invention is not limited to these Examples. Evaluation items in Examples are as described below.

(1) Product A×E

Calculation was performed through use of an optical simulation. A simulator for a liquid crystal display unit "LCD MASTER Ver. 8.1.0.3" manufactured by Shintech, Inc. was used in the optical simulation, and the azimuth angles of the emitted polarized light of light having a wavelength of from 450 nm to 650 nm in a direction at an azimuth angle of 45° and a polar angle of 60° were calculated by using the extended function of the LCD MASTER. A difference between the maximum and minimum of the calculated values was represented by A. In addition, the ellipticities of the emitted polarized light of the light having a wavelength of from 450 nm to 650 nm in the direction at an azimuth angle of 45° and a polar angle of 60° were calculated, and a difference between the maximum and minimum of the calculated values was represented by E.

(2) Maximum Black Brightness

A black image was displayed on each of liquid crystal display apparatus obtained in Examples and Comparative Examples, and its brightnesses at a polar angle of 60° in all azimuths (in increments of 5°) were determined with a brightness meter (manufactured by AUTRONIC-MELCHERS GmbH, product name: "ConoScope"). The maximum of the determined values was adopted as the maximum black brightness (unit: cd/m=).

Production Example 1: Production of Viewer-Side Polarizing Plate

An amorphous isophthalic copolymerized polyethylene terephthalate film (thickness: 100 μm), which was of an elongate shape and had a Tg of about 75° C., was used as a thermoplastic resin substrate, and one surface of the resin substrate was subjected to corona treatment.

A product obtained by adding 13 parts by weight of potassium iodide to 100 parts by weight of a PVA-based resin, which had been obtained by mixing polyvinyl alcohol (polymerization degree: 4,200, saponification degree: 99.2 mol %) and acetoacetyl-modified PVA (manufactured by the Nippon Synthetic Chemical Industry Co., Ltd., product name: "GOHSEFIMER") at 9:1, was dissolved in water to prepare a PVA aqueous solution (application liquid).

The PVA aqueous solution was applied to the corona-treated surface of the resin substrate, and was dried at 60° C. to form a PVA-based resin layer having a thickness of 13 μm. Thus, a laminate was produced.

The resultant laminate was uniaxially stretched in its longitudinal direction (lengthwise direction) at 2.4 times in an oven at 130° C. (in-air auxiliary stretching treatment).

Next, the laminate was immersed in an insolubilizing bath having a liquid temperature of 40° C. (aqueous solution of boric acid obtained by compounding 100 parts by weight of water with 4 parts by weight of boric acid) for 30 seconds (insolubilizing treatment).

Next, the laminate was immersed in a dyeing bath having a liquid temperature of 30° C. (aqueous solution of iodine obtained by compounding 100 parts by weight of water with iodine and potassium iodide at a weight ratio of 1:7) for 60 seconds while the concentration of the bath was adjusted so that the single layer transmittance (Ts) of a polarizer to be finally obtained became a desired value (dyeing treatment).

Next, the laminate was immersed in a cross-linking bath having a liquid temperature of 40° C. (aqueous solution of boric acid obtained by compounding 100 parts by weight of water with 3 parts by weight of potassium iodide and with 5 parts by weight of boric acid) for 30 seconds (cross-linking treatment).

After that, the laminate was uniaxially stretched in the longitudinal direction (lengthwise direction) between rolls having different peripheral speeds so that the total stretching ratio became 5.5 times while being immersed in an aqueous solution of boric acid having a liquid temperature of 70° C. (boric acid concentration: 4 wt %, potassium iodide concentration: 5 wt %) (underwater stretching treatment).

After that, the laminate was immersed in a washing bath having a liquid temperature of 20° C. (aqueous solution obtained by compounding 100 parts by weight of water with 4 parts by weight of potassium iodide) (washing treatment).

After that, the laminate was brought into contact with a SUS-made heating roll, which had a surface temperature kept at about 75° C., while being dried in an oven kept at about 90° C. (drying shrinkage treatment).

Thus, a polarizer having a thickness of about 5 μm was formed on the resin substrate to provide a laminate having the configuration "resin substrate/first polarizer".

A HC-TAC film was bonded as an outer protective layer to the surface of the first polarizer of the resultant laminate (surface opposite to the resin substrate). Next, the resin substrate was peeled. Thus, a viewer-side polarizing plate having the configuration "outer protective layer/first polarizer" was obtained.

Production Example 2: Production of Back Surface-Side Polarizing Plate

A laminate having the configuration "resin substrate/second polarizer" was obtained in the same manner as in Production Example 1. A TAC film (thickness: 20 μm) was bonded as an inner protective layer to the polarizer surface (surface opposite to the resin substrate) of the resultant laminate. Next, the resin substrate was peeled, and a reflective polarizer (thickness: 26 μm) was bonded to the peeling surface via a pressure-sensitive adhesive layer (thickness: 12 μm)). Thus, a back surface-side polarizing plate having the configuration "reflective polarizer/second polarizer/inner protective layer" was obtained.

Example 3: Production of First Optical Compensation Layer Including Single Layer 3-1. Synthesis of Polyarylate 27.0 kg of 2,2-bis(4-hydroxyphenyl)-4-methylpentane and 0.8 kg of tetrabutylammonium chloride were dissolved in 250 L of a sodium hydroxide solution in a reaction vessel including a stirring apparatus. To the stirred solution, a solution obtained by dissolving 13.5 kg of terephthaloyl chloride and 6.30 kg of isophthaloyl chloride in 300 L of toluene was added all at once, followed by stirring at room temperature for 90 minutes. Thus, a polycondensation solution was obtained. After that, the polycondensation solution was separated by being left to stand still to separate a toluene solution containing polyarylate. Next, the separated liquid was washed with aqueous acetic acid and further washed with ion-exchanged water. After that, the washed product was loaded into methanol to precipitate the polyarylate. The precipitated polyarylate was filtered and dried under reduced pressure to provide 34.1 kg of white polyarylate (yield: 92%).

3-2. Production of Retardation Film

An application liquid was prepared by dissolving 10 kg of the polyarylate obtained in the foregoing in 73 kg of toluene. After that, the application liquid was directly applied onto a shrinkable film (longitudinally uniaxially stretched polypropylene film, manufactured by Tokyo Printing Ink Mfg. Co., Ltd., product name: "NOBLEN"), and the applied film was dried at a drying temperature of 60° C. for 5 minutes and then at a drying temperature of 80° C. for 5 minutes to form a laminate of the shrinkable film and a birefringent layer. The resultant laminate was stretched with a simultaneous biaxial stretching machine at a stretching temperature of 155° C. in its MD direction at a shrinkage ratio of 0.70 and in its TD direction at 1.15 times. Thus, a retardation film was formed on the shrinkable film. Next, the retardation film was peeled from the shrinkable film. The retardation film had a thickness of 17.0 μm, an Re(550) of 270 nm, an Rth(550) of 135 nm, and an Nz coefficient of 0.5. The retardation film was used as a first optical compensation layer including a single layer.

Production Example 4: Production of Laminate of First Optical Compensation Layer and Third Optical Compensation Layer 4-1. Production of First Optical Compensation Layer A pellet-shaped resin of a styrene-maleic anhydride copolymer (manufactured by NOVA Chemicals Japan Ltd., product name: "DYLARK D232") was extruded with a single-screw extruder and a T-die at 270° C., and the resultant sheet-shaped molten resin was cooled with a cooling drum to provide a film having a thickness of 100 μm. The film was subjected to free-end uniaxial stretching in its conveying direction with a roll stretching machine at a temperature of 130° C. and a stretching ratio of 1.6 times to provide a film having a fast axis in the conveying direction (longitudinal stretching step). The resultant film was subjected to fixed-end uniaxial stretching in its widthwise direction with a tenter stretching machine at a temperature of 135° C. so that its film width became 1.6 times as large as the film width after the longitudinal stretching. Thus, a biaxially stretched retardation film having a thickness of 50 μm was obtained (lateral stretching step). The retardation film had an Re(550) of 36 nm, a Rth(550) of −90 nm, and an Nz coefficient of −2.5. The retardation film was adopted as a first optical compensation layer.

4-2. Production of Third Optical Compensation Layer

A commercially available cycloolefin (norbornene)-based resin film was stretched by an ordinary method to provide a retardation film. The retardation film had a thickness of 33 μm, an Re(550) of 139 nm, a Rth(550) of 139 nm, and an Nz coefficient of 1.0. The retardation film was adopted as a third optical compensation layer.

4-3. Production of Laminate

The first optical compensation layer and the third optical compensation layer were laminated via a pressure-sensitive adhesive. At this time, the layers were laminated so that their slow axes were substantially perpendicular to each other. Thus, a laminate 1 of the first optical compensation layer and the third optical compensation layer was obtained.

Production Example 5: Production of Laminate of First Optical Compensation Layer and Third Optical Compensation Layer 5-1. Production of First Optical Compensation Layer A retardation film was obtained in the same manner as in Production Example 4-1 except that the stretching conditions were changed. The retardation film had a thickness of 5 μm, an Re(550) of 35 nm, a Rth(550) of −85 nm, and an Nz coefficient of −2.4. The retardation film was adopted as a first optical compensation layer.

5-2. Production of Third Optical Compensation Layer

A commercial cycloolefin (norbornene)-based resin film was stretched by an ordinary method to provide a retardation film. The retardation film had a thickness of 18 μm, an Re(550) of 116 nm, an Rth(550) of 139 nm, and an Nz coefficient of 1.2. The retardation film was adopted as a third optical compensation layer.

5-3. Production of Laminate

The first optical compensation layer and the third optical compensation layer were laminated via a pressure-sensitive adhesive. At this time, the layers were laminated so that their slow axes were substantially parallel to each other. Thus, a laminate 2 of the first optical compensation layer and the third optical compensation layer was obtained.

Production Example 6: Production of Second Optical Compensation Layers

20 Parts by weight of a side chain-type liquid crystal polymer represented by the below-indicated chemical formula (I) (numbers 65 and 35 in the formula each represent the mole percent of a monomer unit, and the polymer is represented as a block polymer for convenience: weight-average molecular weight: 5,000), 80 parts by weight of a polymerizable liquid crystal showing a nematic liquid crystal phase (manufactured by BASF SE, product name: Paliocolor LC242), and 5 parts by weight of a photopolymerization initiator (manufactured by Ciba Specialty Chemicals: product name: IRGACURE 907) were dissolved in 200 parts by weight of cyclopentanone to prepare a liquid crystal application liquid. Then, the application liquid was applied to a substrate film subjected to vertical alignment treatment (norbornene-based resin film: manufactured by Zeon Corporation, product name: "ZEONEX") with a bar coater. After that, the applied liquid was dried under heating at 80° C. for 4 minutes so that the liquid crystal was aligned. UV light was applied to the liquid crystal layer to cure the liquid crystal layer. Thus, a second optical compensation layer (thickness: 1.10 μm) showing a refractive index characteristic of nz>nx=ny was formed on the substrate. The second optical compensation layers having different Rth(550)s were produced by changing conditions for the vertical alignment treatment.

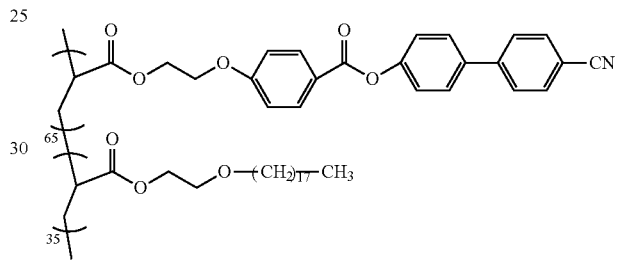

Production Example 7: Production of Negative C-Plates

Negative C-plates (nx=ny>nz) having different Rth(550)s were each produced by using a commercially available triacetylcellulose (TAC) film.

Production Example 8: Preparation of Liquid Crystal Cell

A liquid crystal cell was removed from a liquid crystal display apparatus in an IPS mode (manufactured by Apple Inc., product name: "iPad (trademark)"). Optical members bonded to both surfaces of the liquid crystal cell were removed, and the removing surfaces (outside surfaces of the substrates of the cell) were washed. The washed product was used as a liquid crystal cell 1. The viewer-side substrate of the liquid crystal cell 1 had an Rth(450) of 31.9 nm, an Rth(550) of 18.7 nm, and an Rth(650) of 22.6 nm, and the back surface-side substrate thereof had an Rth(450) of 9 nm, an Rth(550) of 0.3 nm, and an Rth(650) of −6.2 nm.

Production Example 9: Preparation of Liquid Crystal Cell

A liquid crystal cell was removed from a liquid crystal display apparatus in an IPS mode (manufactured by Apple Inc., product name: "iPhone (trademark)"). Optical members bonded to both surfaces of the liquid crystal cell were removed, and the removing surfaces (outside surfaces of the substrates of the cell) were washed. The washed product was used as a liquid crystal cell 2. The viewer-side substrate of the liquid crystal cell 2 had an Rth(450) of 11.1 nm, an Rth(550) of 9.1 nm, and an Rth(650) of −0.1 nm, and the back surface-side substrate thereof had an Rth(450) of 37.1 nm, an Rth(550) of 18.4 nm, and an Rth(650) of 13.4 nm.

Example 1

The retardation film (first optical compensation layer) of Production Example 3 and the viewer-side polarizing plate of Production Example 1 were laminated on the viewer side of the liquid crystal cell 1 of Production Example 8 in the stated order. Meanwhile, the second optical compensation layer (Rth(550)=−20 nm) of Production Example 6 was transferred onto the back surface side of the liquid crystal cell 1, and the back surface-side polarizing plate of Production Example 2 was laminated thereon. The lamination was performed so that the absorption axis direction of the polarizer of the viewer-side polarizing plate and the absorption axis direction of the polarizer of the back surface-side polarizing plate were substantially perpendicular to each other, and the absorption axis direction of the polarizer of the viewer-side polarizing plate and the slow axis direction of the first optical compensation layer were substantially perpendicular to each other. Thus, a liquid crystal display apparatus was produced. The product A×E of the liquid crystal display apparatus was 10. The resultant liquid crystal display apparatus was subjected to the evaluation (2). The result is shown in Table 1.

Example 2

A liquid crystal display apparatus was produced in the same manner as in Example 1 except that the Rth(550) of the second optical compensation layer was set to −40 nm. The product A×E of the liquid crystal display apparatus was 80. The resultant liquid crystal display apparatus was subjected to the same evaluation as that of Example 1. The result is shown in Table 1.

Example 3

A liquid crystal display apparatus was produced in the same manner as in Example 1 except that the Rth(550) of the second optical compensation layer was set to −60 nm. The product A×E of the liquid crystal display apparatus was 210. The resultant liquid crystal display apparatus was subjected to the same evaluation as that of Example 1. The result is shown in Table 1.

Comparative Example 1

A liquid crystal display apparatus was produced in the same manner as in Example 1 except that the negative C-plate (Rth(550)=60 nm) of Production Example 7 was used instead of the second optical compensation layer. The product A×E of the liquid crystal display apparatus was 490. The resultant liquid crystal display apparatus was subjected to the same evaluation as that of Example 1. The result is shown in Table 1.

Example 4

A liquid crystal display apparatus was produced in the same manner as in Example 1 except that the lamination was performed so that the absorption axis direction of the polarizer of the viewer-side polarizing plate and the slow axis direction of the first optical compensation layer were substantially parallel to each other. The product A×E of the liquid crystal display apparatus was 10. The resultant liquid crystal display apparatus was subjected to the same evaluation as that of Example 1. The result is shown in Table 1.

Example 5

A liquid crystal display apparatus was produced in the same manner as in Example 4 except that the Rth(550) of the second optical compensation layer was set to −40 nm. The product A×E of the liquid crystal display apparatus was 80. The resultant liquid crystal display apparatus was subjected to the same evaluation as that of Example 1. The result is shown in Table 1.

Example 6

A liquid crystal display apparatus was produced in the same manner as in Example 4 except that the Rth(550) of the second optical compensation layer was set to −60 nm. The product A×E of the liquid crystal display apparatus was 210. The resultant liquid crystal display apparatus was subjected to the same evaluation as that of Example 1. The result is shown in Table 1.

Comparative Example 2

A liquid crystal display apparatus was produced in the same manner as in Example 4 except that the negative C-plate (Rth(550)=60 nm) of Production Example 7 was used instead of the second optical compensation layer. The product A×E of the liquid crystal display apparatus was 490. The resultant liquid crystal display apparatus was subjected to the same evaluation as that of Example 1. The result is shown in Table 1.

Example 7

A liquid crystal display apparatus was produced in the same manner as in Example 1 except that the liquid crystal cell 2 of Production Example 9 was used instead of the liquid crystal cell 1. The product A×E of the liquid crystal display apparatus was 30. The resultant liquid crystal display apparatus was subjected to the same evaluation as that of Example 1. The result is shown in Table 1.

Example 8

A liquid crystal display apparatus was produced in the same manner as in Example 7 except that the Rth(550) of the second optical compensation layer was set to −40 nm. The product A×E of the liquid crystal display apparatus was 10. The resultant liquid crystal display apparatus was subjected to the same evaluation as that of Example 1. The result is shown in Table 1.

Example 9

A liquid crystal display apparatus was produced in the same manner as in Example 7 except that the Rth(550) of the second optical compensation layer was set to −60 nm. The product A×E of the liquid crystal display apparatus was 80. The resultant liquid crystal display apparatus was subjected to the same evaluation as that of Example 1. The result is shown in Table 1.

Comparative Example 3

A liquid crystal display apparatus was produced in the same manner as in Example 7 except that the negative C-plate (Rth(550)=40 nm) of Production Example 7 was used instead of the second optical compensation layer. The product A×E of the liquid crystal display apparatus was 520. The resultant liquid crystal display apparatus was subjected to the same evaluation as that of Example 1. The result is shown in Table 1.

Comparative Example 4

A liquid crystal display apparatus was produced in the same manner as in Comparative Example 3 except that the Rth(550) of the negative C-plate was set to 60 nm. The product A×E of the liquid crystal display apparatus was 850. The resultant liquid crystal display apparatus was subjected to the same evaluation as that of Example 1. The result is shown in Table 1.

Example 10

A liquid crystal display apparatus was produced in the same manner as in Example 7 except that the lamination was performed so that the absorption axis direction of the polarizer of the viewer-side polarizing plate and the slow axis direction of the first optical compensation layer were substantially parallel to each other. The product A×E of the liquid crystal display apparatus was 30. The resultant liquid crystal display apparatus was subjected to the same evaluation as that of Example 1. The result is shown in Table 1.

Example 11

A liquid crystal display apparatus was produced in the same manner as in Example 10 except that the Rth(550) of the second optical compensation layer was set to −40 nm. The product A×E of the liquid crystal display apparatus was 10. The resultant liquid crystal display apparatus was subjected to the same evaluation as that of Example 1. The result is shown in Table 1.

Example 12

A liquid crystal display apparatus was produced in the same manner as in Example 10 except that the Rth(550) of the second optical compensation layer was set to −60 nm. The product A×E of the liquid crystal display apparatus was 80. The resultant liquid crystal display apparatus was subjected to the same evaluation as that of Example 1. The result is shown in Table 1.

Comparative Example 5

A liquid crystal display apparatus was produced in the same manner as in Example 10 except that the negative C-plate (Rth(550)=40 nm) of Production Example 7 was used instead of the second optical compensation layer. The product A×E of the liquid crystal display apparatus was 520. The resultant liquid crystal display apparatus was subjected to the same evaluation as that of Example 1. The result is shown in Table 1.

Comparative Example 6

A liquid crystal display apparatus was produced in the same manner as in Comparative Example 5 except that the Rth(550) of the negative C-plate was set to 60 nm. The product A×E of the liquid crystal display apparatus was 850. The resultant liquid crystal display apparatus was subjected to the same evaluation as that of Example 1. The result is shown in Table 1.

Example 13

The laminate 1 of Production Example 4 and the viewer-side polarizing plate of Production Example 1 were laminated on the viewer side of the liquid crystal cell 1 of Production Example 8 in the stated order. At this time, the laminate 1 was laminated so that the first optical compensation layer was arranged on the viewer side. Meanwhile, the second optical compensation layer (Rth(550)=−20 nm) of Production Example 6 was transferred onto the back surface side of the liquid crystal cell 1, and the back surface-side polarizing plate of Production Example 2 was laminated thereon. The lamination was performed so that the absorption axis direction of the polarizer of the viewer-side polarizing plate and the absorption axis direction of the polarizer of the back surface-side polarizing plate were substantially perpendicular to each other, and the absorption axis direction of the polarizer of the viewer-side polarizing plate and the slow axis direction of the first optical compensation layer were substantially parallel to each other. Thus, a liquid crystal display apparatus as illustrated in FIG. 3 was produced. The product A×E of the liquid crystal display apparatus was 10. The resultant liquid crystal display apparatus was subjected to the same evaluation as that of Example 1. The result is shown in Table 1.

Example 14

A liquid crystal display apparatus was produced in the same manner as in Example 13 except that the Rth(550) of the second optical compensation layer was set to −40 nm. The product A×E of the liquid crystal display apparatus was 80. The resultant liquid crystal display apparatus was subjected to the same evaluation as that of Example 1. The result is shown in Table 1.

Example 15

A liquid crystal display apparatus was produced in the same manner as in Example 13 except that the Rth(550) of the second optical compensation layer was set to −60 nm. The product A×E of the liquid crystal display apparatus was 210. The resultant liquid crystal display apparatus was subjected to the same evaluation as that of Example 1. The result is shown in Table 1.

Comparative Example 7

A liquid crystal display apparatus was produced in the same manner as in Example 13 except that the negative C-plate (Rth(550)=60 nm) of Production Example 7 was used instead of the second optical compensation layer. The product A×E of the liquid crystal display apparatus was 490. The resultant liquid crystal display apparatus was subjected to the same evaluation as that of Example 1. The result is shown in Table 1.

Example 16

The laminate 2 of Production Example 5 and the viewer-side polarizing plate of Production Example 1 were laminated on the viewer side of the liquid crystal cell 1 of Production Example 8 in the stated order. At this time, the laminate 2 was laminated so that the first optical compensation layer was arranged on the liquid crystal cell side. Meanwhile, the second optical compensation layer (Rth (550)=−20 nm) of Production Example 6 was transferred onto the back surface side of the liquid crystal cell 1, and the back surface-side polarizing plate of Production Example 2 was laminated thereon. The lamination was performed so that the absorption axis direction of the polarizer of the viewer-side polarizing plate and the absorption axis direction of the polarizer of the back surface-side polarizing plate were substantially perpendicular to each other, and the absorption axis direction of the polarizer of the viewer-side polarizing plate and the slow axis direction of the first optical compensation layer were substantially perpendicular to each other. Thus, a liquid crystal display apparatus as illustrated in FIG. 2 was produced. The product A×E of the liquid crystal display apparatus was 10. The resultant liquid crystal display apparatus was subjected to the same evaluation as that of Example 1. The result is shown in Table 1.

Example 17

A liquid crystal display apparatus was produced in the same manner as in Example 16 except that the Rth(550) of the second optical compensation layer was set to −40 nm. The product A×E of the liquid crystal display apparatus was 80. The resultant liquid crystal display apparatus was subjected to the same evaluation as that of Example 1. The result is shown in Table 1.

Example 18

A liquid crystal display apparatus was produced in the same manner as in Example 16 except that the Rth(550) of the second optical compensation layer was set to −60 nm. The product A×E of the liquid crystal display apparatus was 210. The resultant liquid crystal display apparatus was subjected to the same evaluation as that of Example 1. The result is shown in Table 1.

Comparative Example 8

A liquid crystal display apparatus was produced in the same manner as in Example 16 except that the negative C-plate (Rth(550)=60 nm) of Production Example 7 was used instead of the second optical compensation layer. The product A×E of the liquid crystal display apparatus was 490. The resultant liquid crystal display apparatus was subjected to the same evaluation as that of Example 1. The result is shown in Table 1.

Example 19

A liquid crystal display apparatus was produced in the same manner as in Example 13 except that the liquid crystal cell 2 of Production Example 9 was used instead of the liquid crystal cell 1. The product A×E of the liquid crystal display apparatus was 30. The resultant liquid crystal display apparatus was subjected to the same evaluation as that of Example 1. The result is shown in Table 1.

Example 20

A liquid crystal display apparatus was produced in the same manner as in Example 19 except that the Rth(550) of the second optical compensation layer was set to −40 nm. The product A×E of the liquid crystal display apparatus was 10. The resultant liquid crystal display apparatus was subjected to the same evaluation as that of Example 1. The result is shown in Table 1.

Example 21

A liquid crystal display apparatus was produced in the same manner as in Example 19 except that the Rth(550) of the second optical compensation layer was set to −60 nm. The product A×E of the liquid crystal display apparatus was 80. The resultant liquid crystal display apparatus was subjected to the same evaluation as that of Example 1. The result is shown in Table 1.

Comparative Example 9

A liquid crystal display apparatus was produced in the same manner as in Example 19 except that the negative C-plate (Rth(550)=40 nm) of Production Example 7 was used instead of the second optical compensation layer. The product A×E of the liquid crystal display apparatus was 520. The resultant liquid crystal display apparatus was subjected to the same evaluation as that of Example 1. The result is shown in Table 1.

Comparative Example 10

A liquid crystal display apparatus was produced in the same manner as in Comparative Example 9 except that the Rth(550) of the negative C-plate was set to 60 nm. The product A×E of the liquid crystal display apparatus was 850. The resultant liquid crystal display apparatus was subjected to the same evaluation as that of Example 1. The result is shown in Table 1.

Example 22

A liquid crystal display apparatus was produced in the same manner as in Example 16 except that the liquid crystal cell 2 of Production Example 9 was used instead of the liquid crystal cell 1. The product A×E of the liquid crystal display apparatus was 30. The resultant liquid crystal display apparatus was subjected to the same evaluation as that of Example 1. The result is shown in Table 1.

Example 23

A liquid crystal display apparatus was produced in the same manner as in Example 22 except that the Rth(550) of the second optical compensation layer was set to −40 nm. The product A×E of the liquid crystal display apparatus was 10. The resultant liquid crystal display apparatus was subjected to the same evaluation as that of Example 1. The result is shown in Table 1.

Example 24

A liquid crystal display apparatus was produced in the same manner as in Example 22 except that the Rth(550) of the second optical compensation layer was set to −60 nm. The product A×E of the liquid crystal display apparatus was 80. The resultant liquid crystal display apparatus was subjected to the same evaluation as that of Example 1. The result is shown in Table 1.

Comparative Example 11

A liquid crystal display apparatus was produced in the same manner as in Example 22 except that the negative C-plate (Rth(550)=40 nm) of Production Example 7 was used instead of the second optical compensation layer. The product A×E of the liquid crystal display apparatus was 520. The resultant liquid crystal display apparatus was subjected to the same evaluation as that of Example 1. The result is shown in Table 1.

Comparative Example 12

A liquid crystal display apparatus was produced in the same manner as in Comparative Example 11 except that the Rth(550) of the negative C-plate was set to 60 nm. The product A×E of the liquid crystal display apparatus was 850. The resultant liquid crystal display apparatus was subjected to the same evaluation as that of Example 1. The result is shown in Table 1.

TABLE 1

| | Liquid crystal cell | First optical compensation layer | Rth (550) | Product A × E | Maximum black brightness |
|---|---|---|---|---|---|
| Example 1 | 1 | Single layer | −20 | 10 | 0.36 |
| Example 2 | 1 | Single layer | −40 | 80 | 0.38 |
| Example 3 | 1 | Single layer | −60 | 210 | 0.42 |
| Comparative Example 1 | 1 | Single layer | 60 | 490 | 0.84 |
| Example 4 | 1 | Single layer | −20 | 10 | 0.35 |
| Example 5 | 1 | Single layer | −40 | 80 | 0.36 |
| Example 6 | 1 | Single layer | −60 | 210 | 0.58 |
| Comparative Example 2 | 1 | Single layer | 60 | 490 | 1.12 |
| Example 7 | 2 | Single layer | −20 | 30 | 0.38 |
| Example 8 | 2 | Single layer | −40 | 10 | 0.34 |
| Example 9 | 2 | Single layer | −60 | 80 | 0.40 |
| Comparative Example 3 | 2 | Single layer | 40 | 520 | 0.84 |
| Comparative Example 4 | 2 | Single layer | 60 | 850 | 1.62 |
| Example 10 | 2 | Single layer | −20 | 30 | 0.40 |
| Example 11 | 2 | Single layer | −40 | 10 | 0.34 |
| Example 12 | 2 | Single layer | −60 | 80 | 0.70 |
| Comparative Example 5 | 2 | Single layer | 40 | 520 | 1.22 |
| Comparative Example 6 | 2 | Single layer | 60 | 850 | 2.04 |
| Example 13 | 1 | Laminate 1 | −20 | 10 | 0.26 |
| Example 14 | 1 | Laminate 1 | −40 | 80 | 0.40 |
| Example 15 | 1 | Laminate 1 | −60 | 210 | 0.88 |
| Compartative Example 7 | 1 | Laminate 1 | 60 | 490 | 1.40 |
| Example 16 | 1 | Laminate 2 | −20 | 10 | 0.32 |
| Example 17 | 1 | Laminate 2 | −40 | 80 | 0.40 |
| Example 18 | 1 | Laminate 2 | −60 | 210 | 0.84 |
| Comparative Example 8 | 1 | Laminate 2 | 60 | 490 | 1.82 |
| Example 19 | 2 | Laminate 1 | −20 | 30 | 0.40 |
| Example 20 | 2 | Laminate 1 | −40 | 10 | 0.38 |
| Example 21 | 2 | Laminate 1 | −60 | 80 | 0.76 |
| Comparative Example 9 | 2 | Laminate 1 | 40 | 520 | 1.30 |
| Comparative Example 10 | 2 | Laminate 1 | 60 | 850 | 3.00 |
| Example 22 | 2 | Laminate 2 | −20 | 30 | 0.30 |
| Example 23 | 2 | Laminate 2 | −40 | 10 | 0.50 |
| Example 24 | 2 | Laminate 2 | −60 | 80 | 0.86 |
| Comparative Example 11 | 2 | Laminate 2 | 40 | 520 | 1.68 |
| Comparative Example 12 | 2 | Laminate 2 | 60 | 850 | 2.80 |

[Evaluation]

As is apparent from Table 1, a liquid crystal display apparatus having sufficiently small black brightness in an oblique direction irrespective of the kind of its liquid crystal cell can be achieved by setting the product A×E to a predetermined value or less (i.e., by controlling the polarization direction and ellipticity of light emitted from the liquid crystal cell in the oblique direction in combination).

INDUSTRIAL APPLICABILITY

The liquid crystal display apparatus of the present invention can be used for various applications, such as portable devices including a personal digital assistant (PDA), a cellular phone, a watch, a digital camera, and a portable gaming machine, OA devices including a personal computer monitor, a notebook-type personal computer, and a copying machine, household electric appliances including a video camera, a liquid crystal television set, and a microwave oven, on-board devices including a reverse monitor, a monitor for a car navigation system, and a car audio, exhibition devices including an information monitor for a commercial store, security devices including a surveillance monitor, and caring/medical devices including a caring monitor and a medical monitor.

REFERENCE SIGNS LIST

10 liquid crystal cell
11 viewer-side substrate
11' back surface-side substrate
20 first polarizer
30 second polarizer
40 first optical compensation layer
50 second optical compensation layer
100 liquid crystal display apparatus
101 liquid crystal display apparatus
102 liquid crystal display apparatus

The invention claimed is:

1. A liquid crystal display apparatus, comprising:
a liquid crystal cell including
a viewer-side substrate,
a back surface-side substrate, and
a liquid crystal layer sandwiched between the viewer-side substrate and the back surface-side substrate, the layer containing liquid crystal molecules aligned in homogeneous alignment wider a state in which an electric field is absent;
a first polarizer arranged on a viewer side of the liquid crystal cell;
a second polarizer arranged on a back surface side of the liquid crystal cell;
a first optical compensation layer arranged between the liquid crystal cell and the first polarizer; and
a second optical compensation layer arranged between the liquid crystal cell and the second polarizer,
wherein the viewer-side substrate and the back surface-side substrate each have a thickness direction retardation Rth(550) of from −10 nm to 100 nm, and
wherein a product A×E of a difference A (°) between a maximum and a minimum of azimuth angles of polarized light of light having a wavelength of from 450 nm to 650 nm, which is emitted from the liquid crystal cell in a direction at a polar angle of 60° and a direction at an azimuth angle of 45°, and a difference E (°) between a maximum and a minimum of ellipticities of the polarized light of the light is 300 or less.

2. The liquid crystal display apparatus according to claim 1, wherein the product A×E is 100 or less.

3. The liquid crystal display apparatus according to claim 1, wherein the first optical compensation layer shows a refractive index characteristic of nx>nz>ny, and the second optical compensation layer shows a refractive index characteristic of nz>nx=ny.

4. The liquid crystal display apparatus according to claim 3, wherein the second optical compensation layer has a thickness direction retardation Rth(550) of −70 nm or more and less than 0 nm.

5. The liquid crystal display apparatus according to claim 1, wherein the viewer-side substrate and the back surface-side substrate each satisfy a relationship of Rth(450)>Rth(550).

6. A liquid crystal display apparatus, comprising:
a liquid crystal cell including
    a viewer-side substrate,
    a back surface-side substrate, and
    a liquid crystal layer sandwiched between the viewer-side substrate and the back surface-side substrate, the layer containing liquid crystal molecules aligned in homogeneous alignment under a state in which an electric field is absent;
a first polarizer arranged on a viewer side of the liquid crystal cell;
a second polarizer arranged on a back surface side of the liquid crystal cell;
a first optical compensation layer arranged between the liquid crystal cell and the first polarizer; and
a second optical compensation layer arranged between the liquid crystal cell and the second polarizer,
wherein the viewer-side substrate and the back surface-side substrate each have a thickness direction retardation Rth(550) of from −10 nm to 100 nm,
wherein the first optical compensation layer is a single layer formed of a resin film including polyarylate or a polycarbonate resin and shows a refractive index characteristic of nx>nz>ny, and the second optical compensation layer shows a refractive index characteristic of nz>nx=ny and has a thickness direction retardation Rth(550) of −70 nm or more and less than 0 nm,
wherein the viewer-side substrate and the back surface-side substrate each satisfy a relationship of Rth(450)>Rth(550)>Rth(650), and
wherein a product A×E of a difference A (°) between a maximum and a minimum of azimuth angles of polarized light of light having a wavelength of from 450 nm to 650 nm, which is emitted from the liquid crystal cell in a direction at a polar angle of 60° and a direction at an azimuth angle of 45°, and a difference E (°) between a maximum and a minimum of ellipticities of the polarized light of the light is 300 or less.

7. The liquid crystal display apparatus according to claim 6, wherein the first optical compensation layer has a photoelastic coefficient of $10 \times 10^{-12}$ m$^2$/N or more.

8. The liquid crystal display apparatus according to claim 6, wherein the polyarylate is represented by the following formula (1):

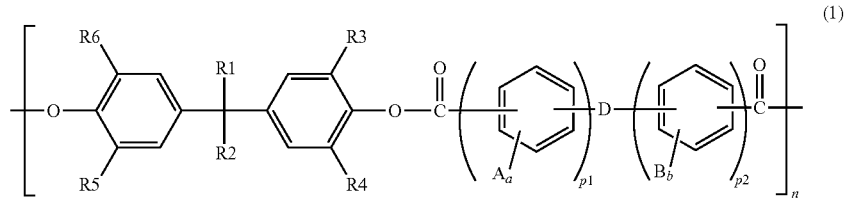

in the formula (1): A and B each represent a substituent, specifically a halogen atom, an alkyl group having 1 to 6 carbon atoms, or a substituted or unsubstituted aryl group, and A and B may be identical to or different from each other; a and b represent the numbers of substitutions with A and B, respectively, and each represent an integer of from 1 to 4; D represents a covalent bond, a CH$_2$ group, a C(CH$_3$)$_2$ group, a C(CZ$_3$)$_2$ group, where Z represents a halogen atom, a CO group, an O atom, a S atom, a SO$_2$ group, a Si(CH$_2$CH$_3$)$_2$ group, or a N(CH$_3$) group; R1 represents a linear or branched alkyl group having 1 to 10 carbon atoms, or a substituted or unsubstituted aryl group; R2 represents a linear or branched alkyl group having 2 to 10 carbon atoms, or a substituted or unsubstituted aryl group; R3, R4, R5, and R6 each independently represent a hydrogen atom or a linear or branched alkyl group having 1 to 4 carbon atoms, and R3, R4, R5, and R6 may be identical to or different from each other; and p1 represents an integer of from 0 to 3, p2 represents an integer of from 1 to 3, and n represents an integer of 2 or more.

9. A liquid crystal display apparatus, comprising:
a liquid crystal cell including
    a viewer-side substrate,
    a back surface-side substrate, and
    a liquid crystal layer sandwiched between the viewer-side substrate and the back surface-side substrate, the layer containing liquid crystal molecules aligned in homogeneous alignment under a state in which an electric field is absent;
a first polarizer arranged on a viewer side of the liquid crystal cell;
a second polarizer arranged on a back surface side of the liquid crystal cell;
a first optical compensation layer arranged between the liquid crystal cell and the first polarizer; and
a second optical compensation layer arranged between the liquid crystal cell and the second polarizer,
wherein the viewer-side substrate and the back surface-side substrate each have a thickness direction retardation Rth(550) of from −10 nm to 100 nm,
wherein the first optical compensation layer is a laminate of a layer showing a refractive index characteristic of nz>nx>ny and a layer showing a refractive index characteristic of nx>ny≥nz, and the second optical compensation layer shows a refractive index characteristic of nz>nx=ny and has a thickness direction retardation Rth(550) of −70 nm or more and less than 0 nm, wherein the viewer-side substrate and the back surface-side substrate each satisfy a relationship of Rth(450)>Rth(550)>Rth(650), and wherein a product A×E of a difference A (°) between a maximum and a minimum of azimuth angles of polarized light of light having a wavelength of from 450 nm to 650 nm, which is emitted from the liquid crystal cell in a direction at a polar angle of 60° and a direction at an azimuth angle of 45°, and a difference E (°) between a maximum and a minimum of ellipticities of the polarized light of the light is 300 or less.

10. The liquid crystal display apparatus according to claim 9, wherein the layer showing a refractive index characteristic of nz>nx>ny includes a resin selected from the group consisting of an acrylic resin, a styrene-based resin, a maleimide-based resin, and a fumarate-based resin.

* * * * *

UNITED STATES PATENT AND TRADEMARK OFFICE
CERTIFICATE OF CORRECTION

PATENT NO. : 11,385,503 B2
APPLICATION NO. : 17/261660
DATED : July 12, 2022
INVENTOR(S) : Daisuke Hayashi et al.

It is certified that error appears in the above-identified patent and that said Letters Patent is hereby corrected as shown below:

On the Title Page

Change Item (71):
"(71) Applicant : NITTO DENKO CORPORATION , Ibaraki (JP)"
To be:
-- (71) Applicant : NITTO DENKO CORPORATION , Ibaraki-shi, Osaka (JP) --

Change Item (72):
"(72) Inventors: Daisuke Hayashi, Ibaraki (JP); Sohei Aruga, Ibaraki (JP); Toshiyuki Iida, Ibaraki (JP)"
To be:
-- (72) Inventors: Daisuke Hayashi, Ibaraki-shi, Osaka (JP); Sohei Aruga, Ibaraki-shi, Osaka (JP); Toshiyuki Iida, Ibaraki-shi, Osaka (JP) --

In the Claims

Change Column 26 Line 47:
"homogeneous alignment wider a state in which an"
To be:
-- homogeneous alignment under a state in which an --

Signed and Sealed this
Fourteenth Day of February, 2023

Katherine Kelly Vidal
*Director of the United States Patent and Trademark Office*